United States Patent
Rosenthal et al.

(10) Patent No.: US 11,874,126 B1
(45) Date of Patent: Jan. 16, 2024

(54) MAP WITH LOCATION-BASED OBSERVATIONS, ACTIONS, AND RULES

(71) Applicants: David A. Rosenthal, Los Altos Hills, CA (US); Andreas H. Bockert, Sunnyvale, CA (US); Jessica A. Butorac, San Jose, CA (US); Gunnar Martin Byrod, San Francisco, CA (US); Shane T. Hinerman, Morgan Hill, CA (US); Kjell Fredrik Larsson, San Jose, CA (US); William W. Luciw, Los Altos, CA (US); Patrick L. Wheeler, San Jose, CA (US)

(72) Inventors: David A. Rosenthal, Los Altos Hills, CA (US); Andreas H. Bockert, Sunnyvale, CA (US); Jessica A. Butorac, San Jose, CA (US); Gunnar Martin Byrod, San Francisco, CA (US); Shane T. Hinerman, Morgan Hill, CA (US); Kjell Fredrik Larsson, San Jose, CA (US); William W. Luciw, Los Altos, CA (US); Patrick L. Wheeler, San Jose, CA (US)

(73) Assignee: APPLE INC., Cupertino, CA (US)

( * ) Notice: Subject to any disclaimer, the term of this patent is extended or adjusted under 35 U.S.C. 154(b) by 497 days.

(21) Appl. No.: 16/131,768

(22) Filed: Sep. 14, 2018

Related U.S. Application Data

(60) Provisional application No. 62/559,078, filed on Sep. 15, 2017.

(51) Int. Cl.
*G01C 21/36* (2006.01)
*G05D 1/00* (2006.01)
*G06F 16/29* (2019.01)
*G06V 20/56* (2022.01)

(52) U.S. Cl.
CPC ....... *G01C 21/3602* (2013.01); *G05D 1/0088* (2013.01); *G06F 16/29* (2019.01); *G06V 20/56* (2022.01); *G05D 2201/0213* (2013.01)

(58) Field of Classification Search
CPC G01C 21/3602; G06F 16/29; G06K 9/00791; G05D 1/0088; G05D 2201/0213
See application file for complete search history.

(56) References Cited

U.S. PATENT DOCUMENTS

| | | | |
|---|---|---|---|
| 7,660,658 B2 | 2/2010 | Sheynblat | |
| 8,063,797 B1 | 11/2011 | Sonnabend et al. | |
| 8,509,982 B2 | 8/2013 | Montemerlo et al. | |
| 8,571,743 B1 | 10/2013 | Cullinane | |
| 9,248,834 B1 * | 2/2016 | Ferguson | B60W 50/0097 |
| 10,133,275 B1 * | 11/2018 | Kobilarov | G06N 3/08 |

(Continued)

FOREIGN PATENT DOCUMENTS

WO 2016055560 A1 4/2016

*Primary Examiner* — Jess Whittington
*Assistant Examiner* — Brian E Yang
(74) *Attorney, Agent, or Firm* — Young Basile Hanlon & MacFarlane, P.C.

(57) ABSTRACT

A method includes obtaining a rule that is associated with a segment of a map, determining a state for use in evaluation of the rule, evaluating the rule using the state, identifying an action to be performed based on a result of evaluating the rule using the state, and utilizing the action to be performed as an input to an automated control system of a vehicle.

22 Claims, 8 Drawing Sheets

(56) References Cited

U.S. PATENT DOCUMENTS

| | | |
|---|---|---|
| 2008/0253615 A1 | 10/2008 | Kubota et al. |
| 2010/0198488 A1 | 8/2010 | Groitzsch et al. |
| 2010/0241605 A1* | 9/2010 | Groitzsch ............ G06V 20/582 |
| | | 701/532 |
| 2011/0190972 A1 | 8/2011 | Timmons et al. |
| 2014/0063232 A1 | 3/2014 | Fairfield et al. |
| 2014/0067187 A1 | 3/2014 | Ferguson et al. |
| 2014/0200739 A1* | 7/2014 | Kirsch .................... H04L 67/12 |
| | | 701/1 |
| 2014/0309913 A1 | 10/2014 | Ricci et al. |
| 2015/0211875 A1* | 7/2015 | Alduaiji ............. G01C 21/3492 |
| | | 701/487 |
| 2016/0357187 A1 | 12/2016 | Ansari |
| 2017/0341575 A1* | 11/2017 | Hauler .................... G09F 13/16 |
| 2017/0371336 A1* | 12/2017 | Mei ................. B60W 30/18163 |
| 2018/0025235 A1* | 1/2018 | Fridman .............. H04N 13/239 |
| | | 382/103 |
| 2018/0045519 A1* | 2/2018 | Ghadiok ............. G06F 16/2379 |
| 2018/0312083 A1* | 11/2018 | Perez Barrera .......... B60N 2/01 |

* cited by examiner

MAP WITH LOCATION-BASED OBSERVATIONS, ACTIONS, AND RULES

CROSS-REFERENCE TO RELATED APPLICATIONS

This application claims the benefit of U.S. Provisional Application No. 62/559,078, filed on Sep. 15, 2017, the content of which is hereby incorporated by reference in its entirety for all purposes.

TECHNICAL FIELD

The application relates generally to the field of digital maps.

BACKGROUND

Digital maps store mapping information in a computer-interpretable format and can include and display features similar to those associated with traditional paper maps, such as geographical features, topographical features, political boundaries, attractions, and transportation networks. Transportation network features that can be displayed on maps include roadways, transit routes, walking paths, and biking paths. In addition, maps can be annotated with various types of information, such as locations and descriptions of businesses.

SUMMARY

One aspect of the disclosed embodiments is a method that includes obtaining a rule that is associated with a segment of a map, determining a state for use in evaluation of the rule, and evaluating the rule using the state. The method also includes identifying an action to be performed based on a result of evaluating the rule using the state and utilizing the action to be performed as an input to an automated control system of a vehicle.

Another aspect of the disclosed embodiments is a non-transitory computer-readable storage device including program instructions executable by one or more processors that, when executed, cause the one or more processors to perform operations. The operations include obtaining a rule that is associated with a segment of a map, determining a state for use in evaluation of the rule, and evaluating the rule using the state. The operations also include identifying an action to be performed based on a result of evaluating the rule using the state and utilizing the action to be performed as an input to an automated control system of a vehicle.

Another aspect of the disclosed embodiments is a system that includes a memory and a processor that is configured to execute instructions that are stored in the memory to obtain a rule that is associated with a segment of a map, determine a state for use in evaluation of the rule, evaluate the rule using the state, identify an action to be performed based on a result of evaluating the rule using the state, and utilize the action to be performed as an input to an automated control system of a vehicle.

DETAILED DESCRIPTION

The disclosure herein is directed to systems and methods in which maps are annotated with rules. The rules are associated with a location on the map, such as a lane segment of a roadway. The rules are evaluated by a system by observing a dynamic property while the system is present at or near the location. The behavior of the system can be modified based on evaluation of the rules.

Figure 1:
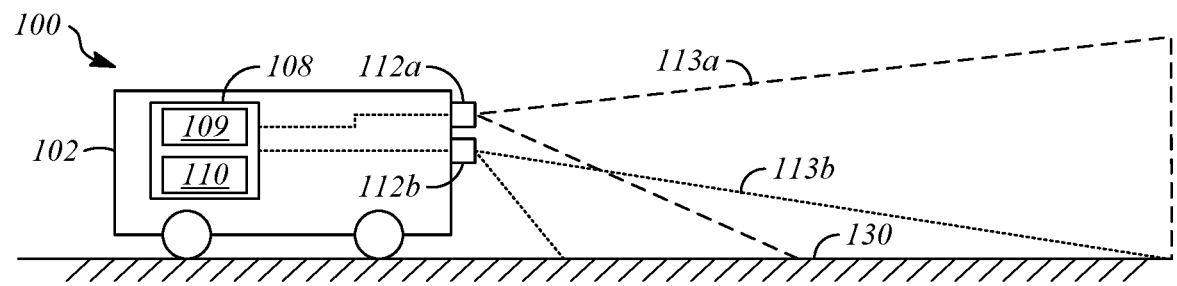
FIG. 1 is an illustration that shows a vehicle travelling on a roadway.

FIG. 1 is an illustration that shows the vehicle 100 travelling on a roadway 130. The vehicle 100 has an image sensor 112a and a range sensor 112b, that are supported by the vehicle body 102 and are oriented such that an image sensor field of view 113a of the image sensor 112a and a range sensor field of view 113b of the range sensor 112b are oriented toward a portion of the environment surrounding the vehicle 100, including the roadway 130. The image sensor 112a and the range sensor 112b transmit information to the automated control system 108, for use in decision making processes by the automated control software 110.

Figure 2:
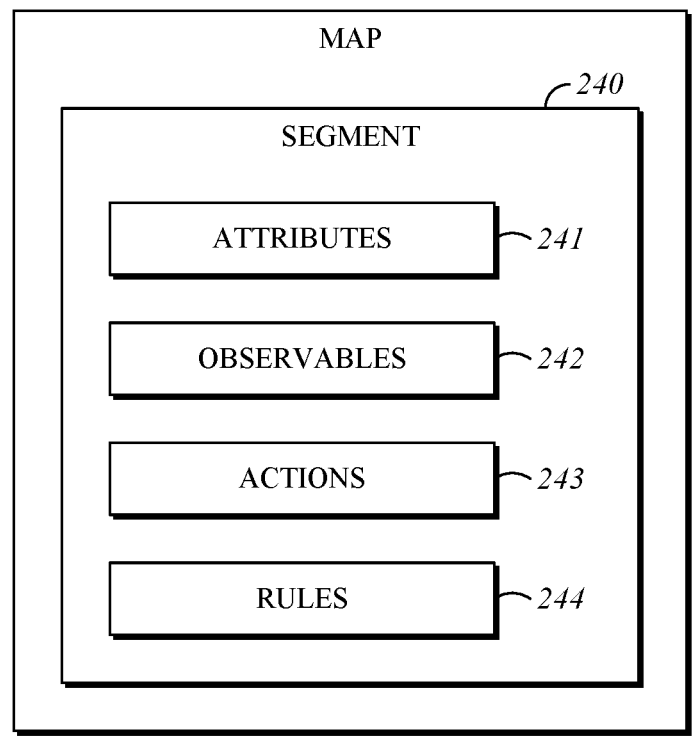
FIG. 2 is a block diagram that shows an example of a data structure for the map.

FIG. 2 is a block diagram that shows an example of a data structure for the map 214. The map 214 is a high definition digital map, as opposed to a standard definition digital map. Standard definition digital maps typically include road-level geometry encoded at mapping grade accuracy. As an example, mapping grade accuracy may refer to a positional accuracy between four centimeters and one meter. Standard definition digital maps are intended to be used to understand vehicle navigation, and typically include limited information regarding the rules of the road. High definition digital maps can include lane-level geometry encoded at survey grade accuracy and are intended to be used to understand usage of roadways and paths by vehicle, bicycles, and pedestrians. As an example, survey grade accuracy may refer to a positional accuracy of less than four centimeters. High definition digital maps can also include information that attempts to describe all of the applicable rules of the road.

Figure 3:
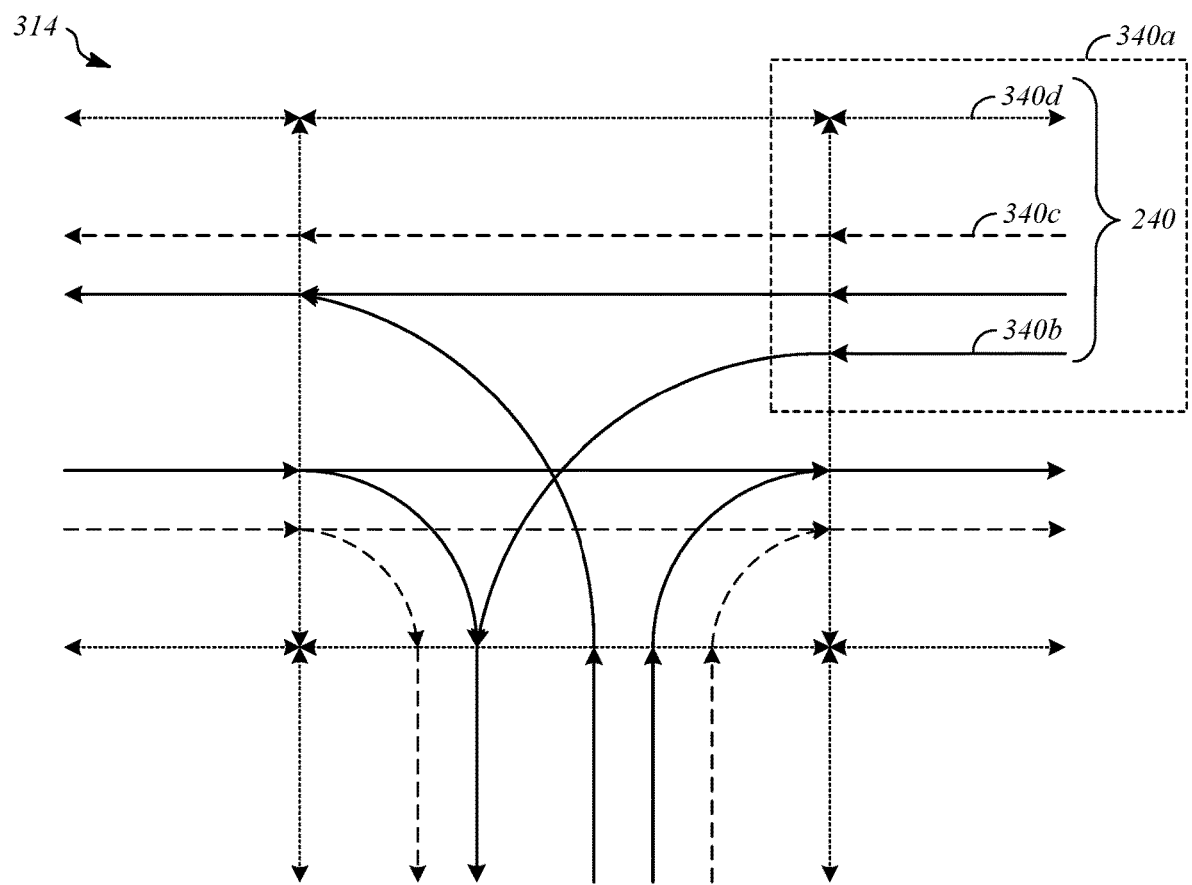
FIG. 3 is an illustration that shows a graphical representation of a map portion of the map.

The map 214 is a collection of data elements that define a transportation network, including segments 240. The segments 240 each correspond to a part of the geometric features of a transportation network, as seen in FIG. 3, which is an illustration that shows a graphical representation of a map portion 314 of the map 214. The segments 240 can include roadway segments 340a, lane segments 340b, pedestrian segments 340c, and bicycle segments 340d. Additional elements of the map 214 can also be encoded as segments, such as lane boundaries or and locations where stopping or yielding may be required. The segments 240 can be organized hierarchically. For example, the roadway segments 340a can each be a parent object that includes one or more of the lane segments 340b, one or more of the pedestrian segments 340c, and/or one or more of the bicycle segments 340d. In the illustrated example, the map portion 314 represents a T-shaped intersection at which right-of-way is controlled by a traffic signal (not shown in FIG. 3), and some of the roadway segments 340a, lane segments 340b, pedestrian segments 340c, and bicycle segments 340d that are shown represent movement of vehicles, pedestrians, and bicycles through the intersection.

With further reference to FIG. 2, attributes 241, observables 242, actions 243, and rules 244 are encoded for each of the segments 240, if applicable. The attributes 241, the observables 242, the actions 243, and the rules 244 can be encoded with each of the segments 240 as part of the map 214, such as in a hierarchical manner as information that is included in each of the segments 240 to separately define each of the segments 240. In an alternative, the attributes 241, the observables 242, the actions 243, and the rules 244 can be encoded in a data structure that is separate from the map 214 but that includes information that relates the attributes 241, the observables 242, the actions 243, and the rules 244 to the segments 240 of the map 214.

The attributes 241 are information that describe each of the segments 240. The attributes 241 include a geometric representation of each segment 240, information describing legal regulations that affect each segment 240, information describing physical connectivity of each segment 240 to other lane segments, and information describing legal connectivity of each segment 240 to other lane segments. Legal connectivity between lane segments may also be referred to as permeability.

The attributes 241 can describe the geometry of each of the segments 240 using geometric representations such as lines, polylines, curves, or polygons. The attributes 241 can further describe geometry of each of the segments 240 by a lane edge attribute that describes the geometry of the lateral (i.e. left and right) edges of each segment 240.

Legal regulations that affect each segment 240 can include traffic regulations governed by city, county, state, and federal laws. As one example, traffic regulations may include regulations that are part of a state vehicle code that includes laws set by a state government that has jurisdiction over the segments 240. As another example, traffic regulations may include regulations that are part of a municipal code set by a municipal government that has jurisdiction over the segments.

One example of an attribute that describes a legal regulation is a maximum speed limit attribute that describes the regulatory speed limit for each segment 240. Another example of an attribute that describes a legal regulation is a bidirectional attribute describes whether the segment 240 is permitted for use by vehicles travelling in both directions, such as is the case for two-way-left-turn lanes. Another example of an attribute that describes a legal regulation is a no left turn attribute that describes whether making a left turn from the segment 240 is permissible. Another example of an attribute that describes a legal regulation is a right turn on red attribute that describes whether it is permissible to make a right turn at a signalized intersection while a red indication is displayed by the traffic signal that controls the segment 240. Another example of an attribute that describes a legal regulation is a lane use restriction that indicates that certain types of vehicles (e.g., large trucks) are not allowed to use certain lanes. Another example of an attribute that describes a legal regulation is a weight restriction that indicates that vehicles over a specified weight are not permitted to use the segment 240. Another example of an attribute that describes a legal regulation is a high occupancy vehicle attribute that describes a minimum number of persons that must be present in a vehicle for the vehicle to be permitted to use the segment 240. Attributes that describe legal regulations can be encoded in any suitable form, such as an integer value or a Boolean value.

A physical connectivity attribute describes how the segments 240 physically connect to each other, in terms of whether movement of the vehicle between them is physically possible. For each of the segments 240, physical connectivity can describe, for example, whether the segment 240 is physically connected to an adjacent left lane at its left edge and whether the segment 240 is physically connected to an adjacent right lane at its right edge. A legal connectivity attribute describes whether legal regulations permit or prohibit movement from each of the segments 240 to adjacent lane segments.

Figure 4:
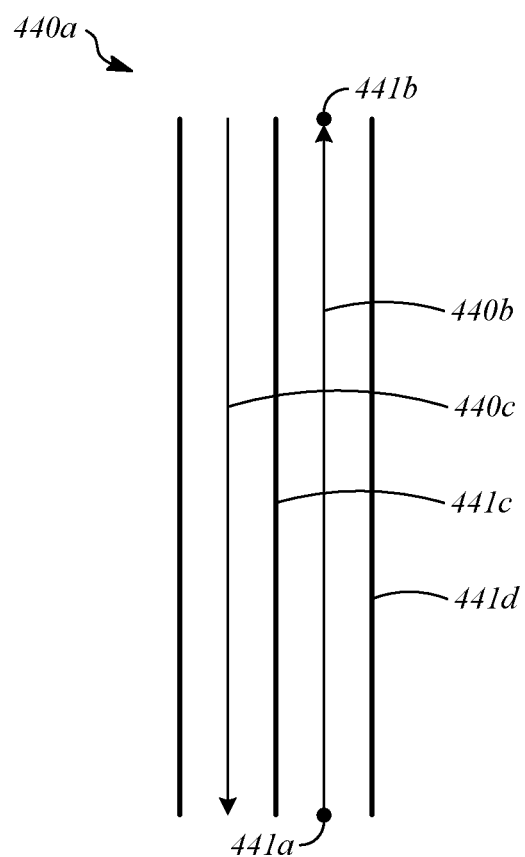
FIG. 4 is an illustration that shows a graphical representation of a roadway segment.

FIG. 4 is an illustration that shows a graphical representation of a roadway segment 440a according to an example. The roadway segment 440a includes a first lane segment 440b and a second lane segment 440c. The first lane segment 440b represents a lane that accommodates vehicle traffic in a first direction, and the second lane segment 440c represents a lane that accommodates vehicle traffic in a second direction that is opposite the first direction. Geometric attributes for the first lane segment 440b include a start point 441a, an end point 441b, a first lane edge 441c, and a second lane edge 441d. Thus, thus the first lane segment 440b can be defined geometrically as located along a line between the start point 441a and the end point 441b, and lying between the first lane edge 441c and the second lane edge 441d, which represent the left and right lateral edges of the first lane segment 440b. Additional attributes that are encoded for the first lane segment 440b can include a bidirectional attribute that indicates that the first lane segment 440b is not bidirectional, a physical connectivity attribute that indicates that the first lane segment 440b is physically connected to the second lane segment 440c, and a legal connectivity attribute that indicates movement from the first lane segment 440b into the second lane segment 440c is not legally permitted.

With further reference to FIG. 2, the observables 242 are dynamic objects that impact the behavior of the vehicle 100 and have states that can be ascertained by the vehicle 100. The observables 242 are associated with the segments 240. The states of some of the observables 242 can be determined using the sensors such as the image sensor 112a and the range sensor 112b. For example, the image sensor 112a can be utilized to determine the current state of a traffic signal (e.g., is a currently displayed signal indication red, yellow, or green). As another example, the image sensor 112a and/or the range sensor 112b can be utilized to determine whether a rail-road crossing gate is down. The states of others of the observables 242 can be determined based on information received from data sources that are available to the vehicle 100, which may be in the vehicle 100 or available for remote access by the vehicle 100. One example of a data source is the current time of day, which may be obtained from a clock associated with the vehicle 100 or from a remote device. Another example of a data source is information that describes characteristics of the vehicle 100, such as weight, class (e.g., car, truck, or bus), and the type of powertrain installed in the vehicle 100 (e.g., electric motors powered by a battery pack or an internal combustion engine powered by liquid fuel).

Some of the observables 242 correspond to elements in the environment around the vehicle 100, such as objects or persons. The presence and state of the observables 242 that correspond to objects in the environment can be detected, for example, by processing and interpreting images obtained by the image sensor 112a (FIG. 1) using machine vision techniques. One example of the observables 242 that correspond to objects in the environment is the state of a traffic signal, which can be one or more of Solid Green, Solid Yellow, Solid Red, Green Arrow, Yellow Arrow, Red Arrow, Flashing Yellow Arrow, Flashing Yellow, Flashing Red, and Blackout. Another example of the observables 242 is the presence of a pedestrian in the area around the vehicle 100. Another example of an observable is the presence of a bicycle in the area around the vehicle 100. Another example of an observable is a number of persons that are present in the vehicle 100, which can be determined, for example, using sensors or images obtained from cameras that are located inside a passenger compartment of the vehicle 100. Some of the observables 242 correspond to information that can be obtained by the automated control system 108 from various sources, such as the time of day or the day of the week.

The actions 243 are directives to the motion planning functions of the automated control system 108 of the vehicle 100, and indicate actions that should be performed by the vehicle 100, actions that may be performed by the vehicle 100, and actions that may not be performed by the vehicle 100. As will be explained herein, the actions 243 are utilized as inputs by the automated control system 108, which will typically control the vehicle 100 in accordance with the actions 243 but may deviate from control according to the actions 243 in some situations, such as when doing so would be unsafe. As an example, if the vehicle 100 is stopped at a signalized intersection and the segment 240 where the vehicle 100 is located is subject to a red indication, the automated control system 108 may choose to proceed into the intersection if a vehicle approaching from behind has a high probability of striking the vehicle 100, and the vehicle 100 can proceed into the intersection with no probability of striking another vehicle, bicycle, or pedestrian.

The actions 243 are associated with the segments 240. Examples of the actions 243 include a must stop action, a must not enter action, a yield to action, and a keep clear action. The must stop action indicates that the vehicle 100 most come to a complete stop at the end of the segment 240. The must not enter action indicates that the vehicle 100 must not enter the segment 240. The yield to action indicates that the vehicle 100 must yield the right-of-way to the traffic in a different lane segment that is designated by the action. The keep clear action indicates that the vehicle 100 should not enter the segment 240 unless it can completely clear the segment 240.

The rules 244 are information that describe the rules of the road and are associated with the segments 240. The rules 244 can be conditional expressions that each evaluate the state of one or more of the observables, and the rules 244 can include decisions to be made based on the states of the observables 242. The decisions made based on the states of the observables 242 using the rules 244 can cause modification of attributes and actions. The rules 244 can indicate that one or more of the actions 243 are to be performed dependent upon the decision made based on a particular one of the rules 244 using the state of one or more of the observables 242.

The structure of the segments 240, including the attributes 241, the observables 242, the actions 243, and the rules 244 allows the rules 244 to be encoded such that they describe the actions 243 with respect to the location associated with the segment 240 and the state of the observables 242. Some of the rules 244, however, can be static and not dependent upon the state of the observables 242. For example, the presence of a stop sign at one of the segments 240 can be encoded in a corresponding one of the rules 244 as a must stop action, and this action 243 can be included in the rule 244 without a conditional expression that must be satisfied to trigger the action 243.

Figure 5:
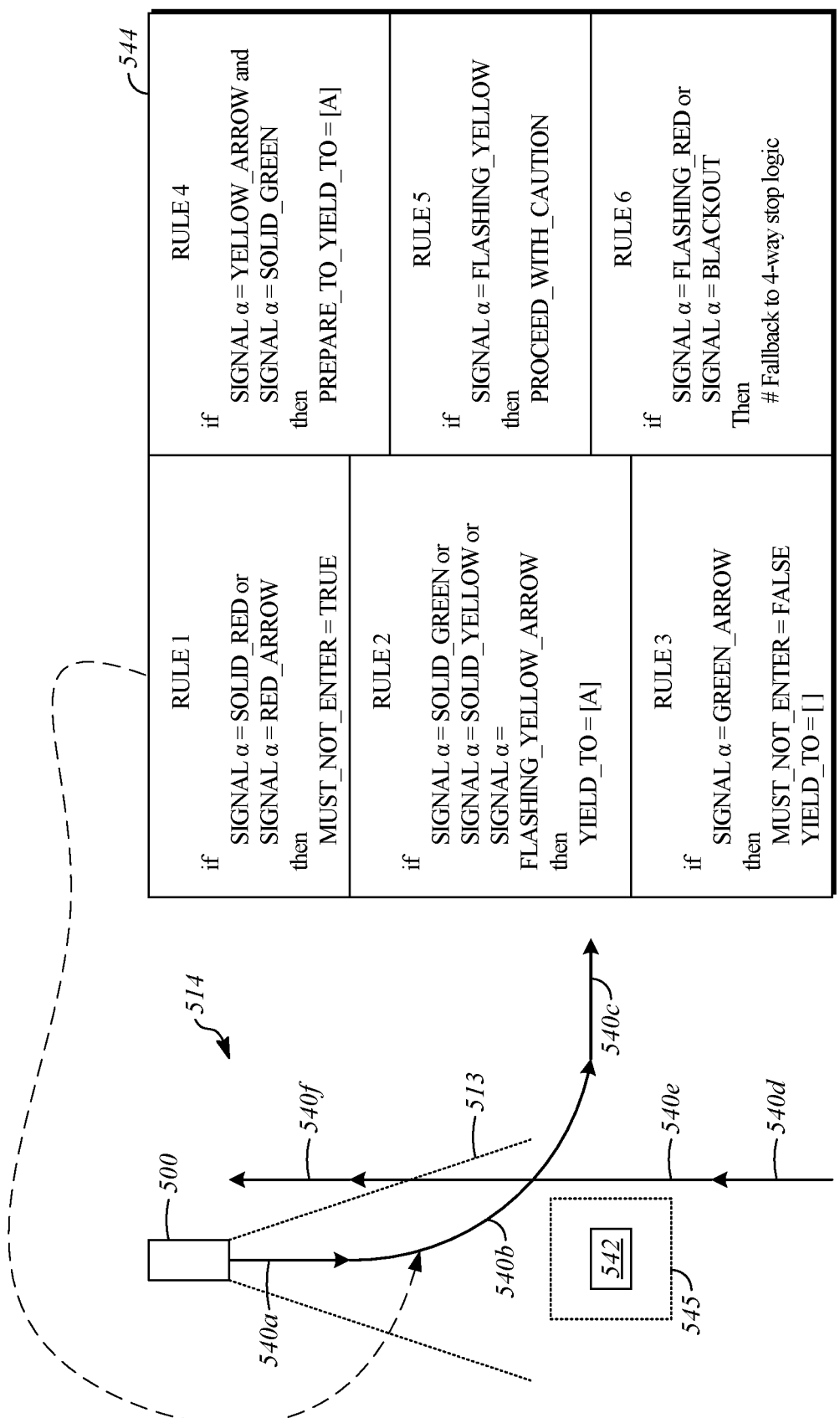
FIG. 5 is an illustration that shows an example of rules applied to a segment.

FIG. 5 is an illustration that shows an example of rules applied to a segment. A map portion 514 includes a first lane segment 540a, a second lane segment 540b, a third lane segment 540c, a fourth lane segment 540d, a fifth lane segment 540e, and a sixth lane segment 540f. The first lane segment 540a, the second lane segment 540b, and the third lane segment 540c correspond to a first traffic movement that is controlled by a traffic signal, which is represented by an observable 542. The observable 542 is located in an observable location 545 that is within a field of view 513 of a sensor, such as a camera that is associated with a vehicle 500 that is traversing the first lane segment 540a and is approaching the second lane segment 540b. The fourth lane segment 540d, the fifth lane segment 540e, and the sixth lane segment 540f correspond to a second traffic movement that approaches the intersection from an opposite direction and proceeds straight through it.

The second lane segment 540b passes through the intersection and is subject to potentially conflicting traffic movements, such as the second traffic movement, by virtue of the fifth lane segment 540e passing through the intersection such that it crosses the second lane segment 540b. Prior to entering the second lane segment 540b, the vehicle 500 evaluates a set of rules 544 that are associated with the second lane segment 540b, and based on the rules, the vehicle 500 determines whether it is permitted to enter the second lane segment 540b.

The rules in the set of rules 544 indicate actions for the vehicle 100 that are based on the state of the observable 542. The states of the observable 542 are represented in the set of rules by the variable SIGNAL α. Possible states for the observable 542 include steady illumination of a red indication (SOLID_RED), flashing illumination of a red indication (FLASHING_RED), steady illumination of a red arrow indication (RED_ARROW), steady illumination of a green indication (SOLID_GREEN), steady illumination of a green arrow indication (GREEN_ARROW), steady illumination of a yellow indication (SOLID_YELLOW), flashing illumination of a yellow indication (FLASHING_YELLOW), steady illumination of a yellow arrow indication (YELLOW_ARROW), flashing illumination of a yellow arrow indication (FLASHING_YELLOW_ARROW), and absence of an illuminated indication (BLACKOUT).

As can be seen in Rules 1-6, a limited number of actions are required to be recognized in order to process the rules in the set of rules 544. Possible actions indicated for the vehicle 500 by the set of rules 544 include MUST_NOT_ENTER as a Boolean value indicating entry into the lane segment is impermissible when true, YIELD_TO as a list of lanes that a vehicle traversing the lane segment must yield to, PREPARE_TO_YIELD_TO as a list of lanes that the vehicle should yield to if practical, and PROCEED_WITH_CAUTION as a Boolean value indicating that it is permissible to traverse the lane segment with caution when true.

As one example, the set of rules 544 includes "Rule 2," which describes permissive left turn movements, in which it may be permissible for the vehicle 500 to execute a left turn through the intersection by traversing the second lane segment 540b, although the vehicle 500 does not have right of way with respect to vehicles traversing the fourth lane segment 540d, the fifth lane segment 540e, and the sixth lane segment 540f. In "Rule 2," if the state of the observable 542, as represented by SIGNAL α, is equal to SOLID_GREEN, SOLID_YELLOW, or FLASHING_YELLOW_ARROW, then the action indicated for the vehicle is YIELD_TO=[A], where "A" represents the fifth lane segment 540e. The YIELD_TO=[A] action means that the vehicle 500 may proceed through the intersection but should yield to vehicles traversing the fifth lane segment 540e.

As another example, "Rule 6" of the set of rules 544 indicates that the vehicle 500 should apply all-way stop control logic if the traffic signal is not operational.

Figure 6:
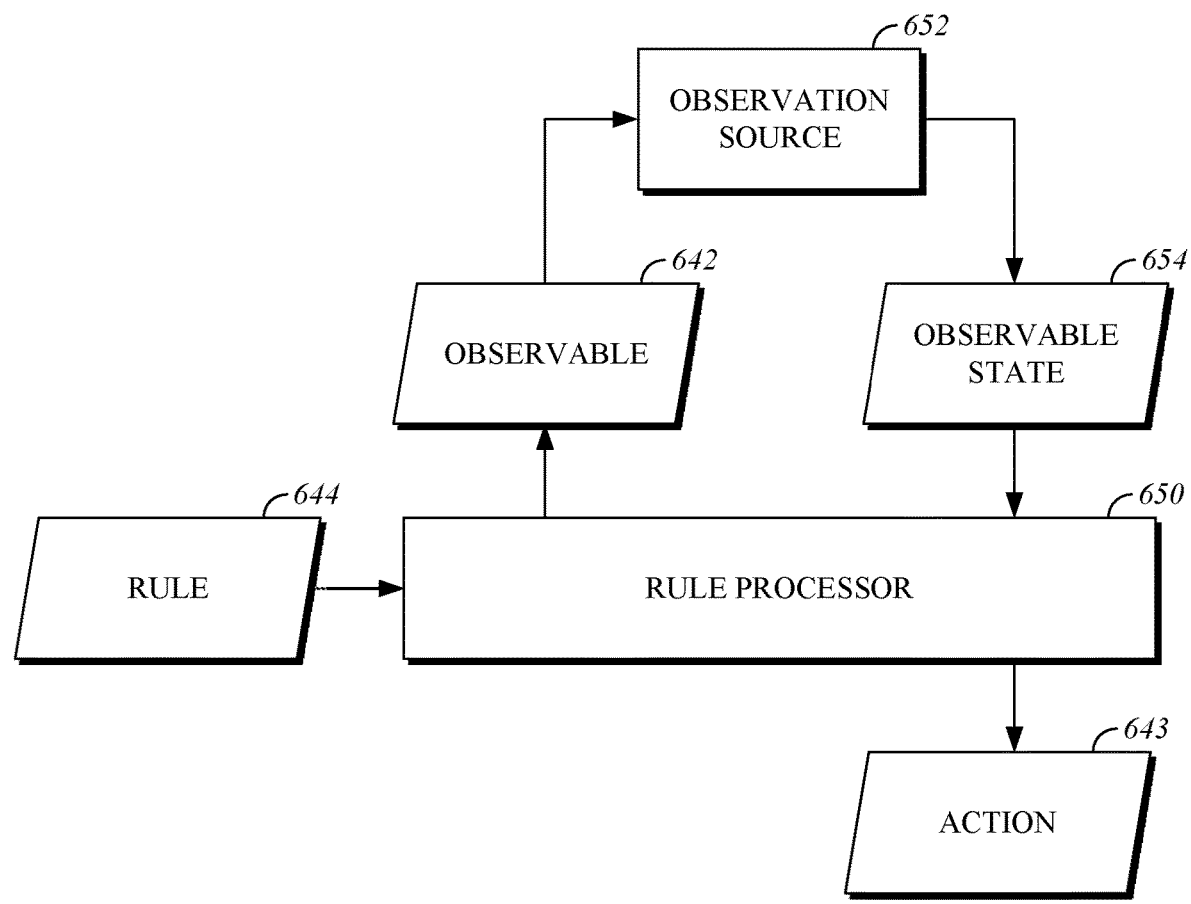
FIG. 6 is a block diagram that shows operation of a rule processor.

FIG. 6 is a block diagram that shows operation of a rule processor 650. The rule processor 650 can be implemented as part of the automated control system 108. For example, the rule processor 650 can be implemented as a software module in the control software 110.

The rule processor 650 receives a rule 644 as an input. The rule 644 one of the rules 244, and is associated with one of the segments 240. The rule 644 can be obtained by the rule processor 650 or transmitted to the rule processor 650 based on proximity of the vehicle 100 with respect to the segment 240 with which the rule 644 is associated.

The rule processor 650 interprets the rule 644. Interpreting the rule 644 can be performed in response to obtaining the rule 644 (e.g., immediately after the rule 644 is obtained). The rule processor 650 identifies an observable 642 that is referred to by the rule 644. The state of the observable 642 may be required for evaluation of the rule 644. As an example, the rule 644 may be structured such that information regarding the observable 642 is required for use of the rule. In some situations, the observable 642 corresponds to information that is specific to the area near the segment 240 with which the rule 644 is associated (i.e., at the geographic location of the segment 240), such as the state of a traffic signal that is located near the segment 240 and can be observed in the vicinity of the segment 240. In other situations, the observable 642 corresponds to information that can be accessed regardless of the current location of the vehicle, such as date and time information or vehicle occupancy information.

Based on the identity of the observable 642, an observation source 652 is identified. In some implementations, the observable 642 can be associated with a particular one of the observation sources 652. The identity and location of the observation source 652 can be encoded as part of the information that is associated with the segment 240. As an example, the observable 642 can include a location identifier. The location identifier is information that specifies the observation source where the observable 642 can be found. The location identifier can specify, for example, whether the observation source 652 corresponds to data that can be accessed or corresponds to a visible object or circumstance inside or outside the vehicle that can be observed using a camera or another sensor. As one example, the location identifier can include information that identifies a data source (e.g., a clock or a database containing vehicle information). As another example, the location identifier can include a geographical location where the observable 642 can be found, such as a location identifier that includes a geographical location where the observable 642 can be found. A location identifier can include, for example, geographic coordinates, such as latitude and longitude coordinates, that define an area in which the observable 642 is located. For instance, the observable location 545 (FIG. 5) can be encoded as a location identifier representing a two-dimensional bounding box that is described by geographic coordinates, is associated with the observable 642, and is usable to select a sensor that can perceive the observable 642, based on the observable location 545 and the respective fields-of-view for available cameras or other sensors.

If the observable 642 corresponds to an object outside of the vehicle 100, a camera oriented to capture images of the environment outside the vehicle 100 can be used as the observation source 652. If the observable 642 corresponds to an object inside the vehicle 100, a camera oriented to capture images of the interior of the vehicle can be used as the observation source 652. If the observable 642 may correspond to a data source, which may be either internal to the vehicle 100, or external to the vehicle 100 and accessed using a wireless communications connection.

The observation source 652 is utilized to determine an observable state 654 of the observable. As an example, if the observable 642 is a traffic signal, the observable state 654 corresponds to illumination of one or more signal indications of the traffic signal. Information describing the observable state 654 is output by the observation source 652 and is transmitted to the rule processor 650.

The description above includes determination of a single observable state for a single observable. The rule 644 could include more than one observable, and that more than one observable state could be output a single output source or by more than one output source.

Using the observable state 654, the rule processor 650 evaluates the rule 644 and determines an action 643 to be performed according to the outcome of the evaluation. As one example, evaluation of the rule 644 by the rule processor 650 may have two possible outcomes, with the first outcome corresponding to a first alternative action, and the second outcome corresponding to a second alternative action. As another example, evaluation of the rule 644 by the rule processor 650 may have two possible outcomes, with the first outcome corresponding to a first alternative action, and the second outcome corresponding to no action. Evaluation of the rule 644 may have any number of possible outcomes.

After determination of the action 643, the action 643 can be utilized by the automated control system 108 in a decision-making process. As one example, the decision-making process of the automated control system 108 outputs commands to cause operation of the vehicle 100 in a manner that is consistent with the action 643. In another example, the automated control system 108 utilizes the action 643 in the decision-making process and determines that the action 643 should not be followed and instead determines an alternative vehicle behavior that is not consistent with the action. In one implementation, a determination as to whether to control the vehicle 100 in accordance with the action 643 is evaluated using a cost function, and a cost penalty is assessed for not following the action 643.

Figure 7:
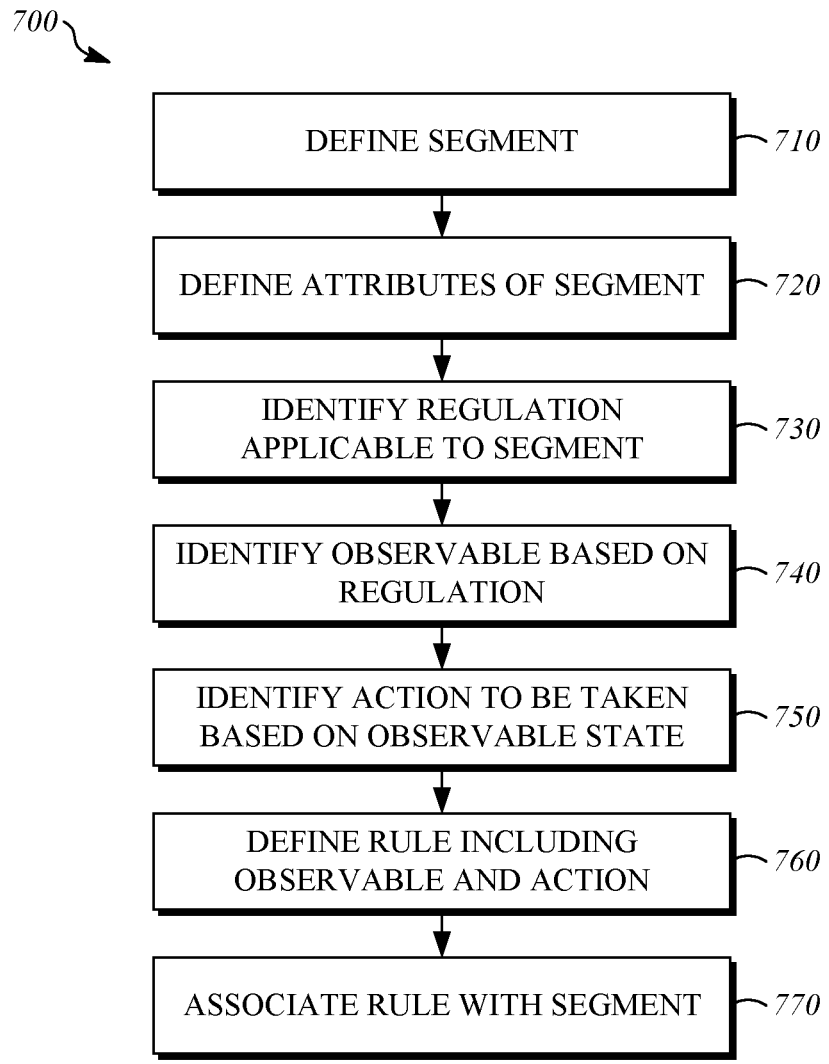
FIG. 7 is flowchart showing a process for encoding a map.

FIG. 7 is flowchart showing a process 700 for encoding a map, such as the map 214. The process 700 can be performed using a computing device that is provided with computer program instructions that facilitate encoding and storage of information for the map 214. The computer program instructions can be stored in a storage device or a memory device and executed by a processor to facilitate performance of the process 700 as described herein.

Operation 710 includes defining a segment, which can be a new instance of one of the segments 240 of the map 214. The segment 240 is created to represent a portion of a transportation network, such as a roadway segment, a lane segment, a bicycle segment, or a pedestrian segment. Operation 720 includes defining one or more of the attributes 241 for the segment 240. Operation 720 can include defining the geographic location of the segment 240. For example, the geographic location for the segment 240 can encoded by two or more points that are described in terms of geographic coordinates (e.g., latitude and longitude). Other information can be used to describe the geographic location of the segment, such as information describing a starting point, which can be described by geographic coordinates or relative to the location of another one of the segments 240. Defining the segment 240 in operation 710 and defining the attributes 241 in operation 720 for the can be performed manually or can be performed by an automated process, such as by identifying features from aerial photographs.

Operation 730 includes identifying a regulation that is applicable to the segment. Identifying the regulation can be done based on, for example, objects in the environment around the segment 240, such as traffic signals or signs or markings designating a restricted-use lane (e.g. HOV lanes). Operation 740 includes identifying an observable 242 based on the regulation. As one example, if the identified regulation is a traffic signal, the observable 242 that corresponds to the observable is a state of the traffic signal indication. As another example, if the regulation is restricted-use lane, the observables 242 that correspond to the regulation may be number of persons that are present in the vehicle and/or a current time of day. Identifying a regulation in operation 730 and identifying an observable 242 in operation 740 can be performed manually or can be performed by an automated process, such as by identifying features (e.g., traffic signals) from photographs or videos of the environment near the segment 240.

Operation 750 includes identifying one or more actions 243 to be taken based on a state of the observable 242. The actions 243 to be taken can be based on the regulation identified and/or the observable 242 identified in operation 740. Operation 760 includes defining the rule 244 that includes the observable 242 and the action 243, for example, by evaluating the observable 242 using a conditional statement that considers a current state of the observable 242, and indicates the action 243 to be taken, if any, based on the outcome of the evaluation. The actions 243 and the rules 244 in operations 750 and 760 can be identified, for example, using a template that associates actions and rules with applicable regulations, either by a manual process or an automated process.

Operation 770 includes associating the rule 244 with the segment 240. As one example, the rule itself can be stored in a data element that is associated with the segment 240, such as in a hierarchical structure. As another example, identifying information, such as a name or number, that identifies the rule 244 can be encoded in association with the segment 240, such that the rule 244 can be accessed from another source when required using the identifying information.

Figure 8:
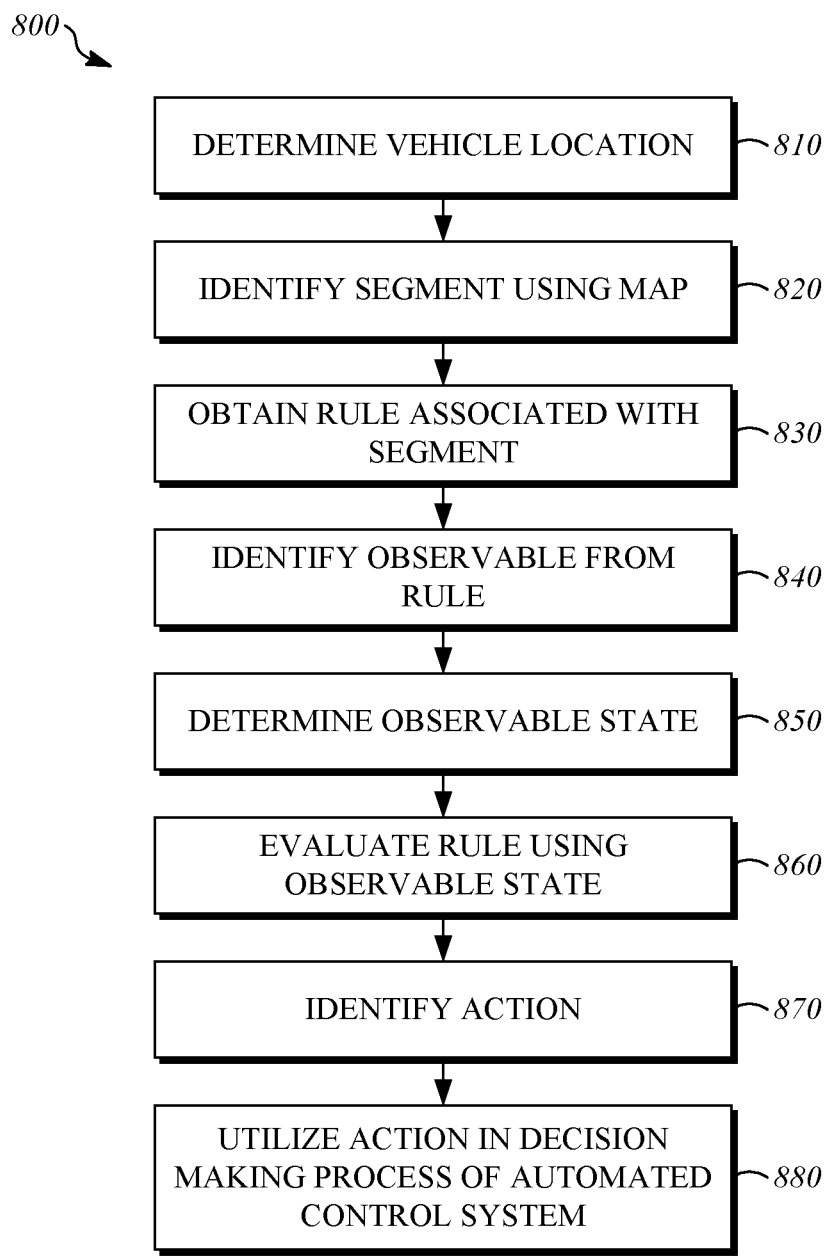
FIG. 8 is a flowchart that shows of a process for automated control of a vehicle.

FIG. 8 is a flowchart that shows of a process 800 for automated control of a vehicle, such as the vehicle 100. The process 800 can be performed using the vehicle 100, and operations of the process can be caused, controlled, or performed by a computing device, such as the control hardware 109 of the automated control system 108. The computing device is provided with computer program instructions, such as the control software 110, that are stored in a storage device or a memory device, and a processor that is operable to execute the computer program instructions. When executed by the processor, the program instructions cause the computing device to perform the operations of the process 800 as described herein.

In operation 810, a vehicle location is determined. The vehicle location is the current geographical position of the vehicle 100. The vehicle location can be determined using a position determining device or system, such as a satellite-based positioning system. One example of a satellite-based positioning system that can be utilized for determining the vehicle location is the Global Positioning System (GPS).

In operation 820, the map 214 is utilized to identify one of the segments 240 based on the vehicle location. As an example, operation 820 can include identifying one or more of the segments 240 of the map 214 that are located near the vehicle location. The vehicle location may correspond to a specific one of the segments 240 of the map 214, which is referred to as a current segment. The additional segments can be identified based on proximity to the current segment. In one implementation, the identified segment or segments are located one segment away from (i.e., connected to or adjacent to) the current segment. In another implementation, the identified segment or segments are located within a threshold number of segments away from the current segment. In another implementation, the identified segment or segments are located within a threshold distance of the current segment.

In operation 830, the rule 244 that is associated with the segment 240 is identified and obtained. The rule 244 can be identified by being stored in association with the segment 240 or by an identifier that references the rule 244 being stored in association with the segment 240. Thus, the segment 240 of the map 214 can be associated with a geographic location and the rule 244 can be obtained based on a position of the vehicle relative to the geographic location, since the rule 244 is associated with the segment 240. Obtaining the rule 244 can be performed by reading the rule 244 from a storage device, accessing it from a memory device, or receiving it in a transmission from another system. In operation 840, the observable 242 is identified using the rule 244, such as by interpreting or parsing the rule 244.

In operation 850, the observable state is determined for the observable 242. The observable state represents a dynamic property having at least a first possible value and a second possible value. The values can be discrete, such as "true," "false," "green," or "red," or the values can be continuous, such as a number or a time value. In some cases, the observable state is a visible attribute of an object that is located in an environment near a geographic location that is associated with the segment 240 that the rule 244 being processed is associated with. The object can be located using a sensor, such as a camera, that is associated with the vehicle 100 based on location information for the object, as previously described. The object can be identified in an image captured by the sensor, using a machine vision technique. The state of the object can be determined based on a visible attribute of the object, such as current color of a traffic signal indication.

The observable state can be determined for use in evaluation of the rule 244 using sensors such as the image sensor 112a and the range sensor 112b, or by reading, accessing, or receiving information that describes the observable state. In one example, the rule 244 of the segment 240 may include information that identifies a location or data source from which a state of the observable 242 can be obtained. This information is utilized to observe the state of the observable 242 using a sensor or to access information that describes the state of the observable 242.

In operation 860, the rule 244 is evaluated using the state of the observable 242. As an example, the rule 244 can include a conditional expression that is dependent upon the state of the observable 242, and the rule 244 can be evaluated by comparing the state of the observable 242 to a state or value given in a conditional expression that is included in the rule 244. In operation 870, an action 243 to performed is identified based on a result of evaluation of the rule 244 using the state of the observable 242. For example, the action 243 can be associated with a particular outcome of the evaluation of the rule 244 using the state of the observable in operation 860.

In operation 880, the action 243 is utilized by an automated control system, such as the automated control system 108 of the vehicle 100, in a decision-making process. The action 243 is one signal that is utilized as an input by the automated control system 108. In some situations, the automated control system 108 will select a behavior that conforms to the action 243. For example, the automated control system 108 will stop motion of the vehicle based on a rule that indicates that the vehicle 100 must stop based on the state of a traffic signal, when the traffic signal is displaying a red indication. In other situations, the automated control system 108 may select a behavior that does not conform to the action 243 based on other signals. For example, the automated control system 108 may select a behavior that does not conform to the action 243 if doing so would result in an unsafe condition.

Figure 9:
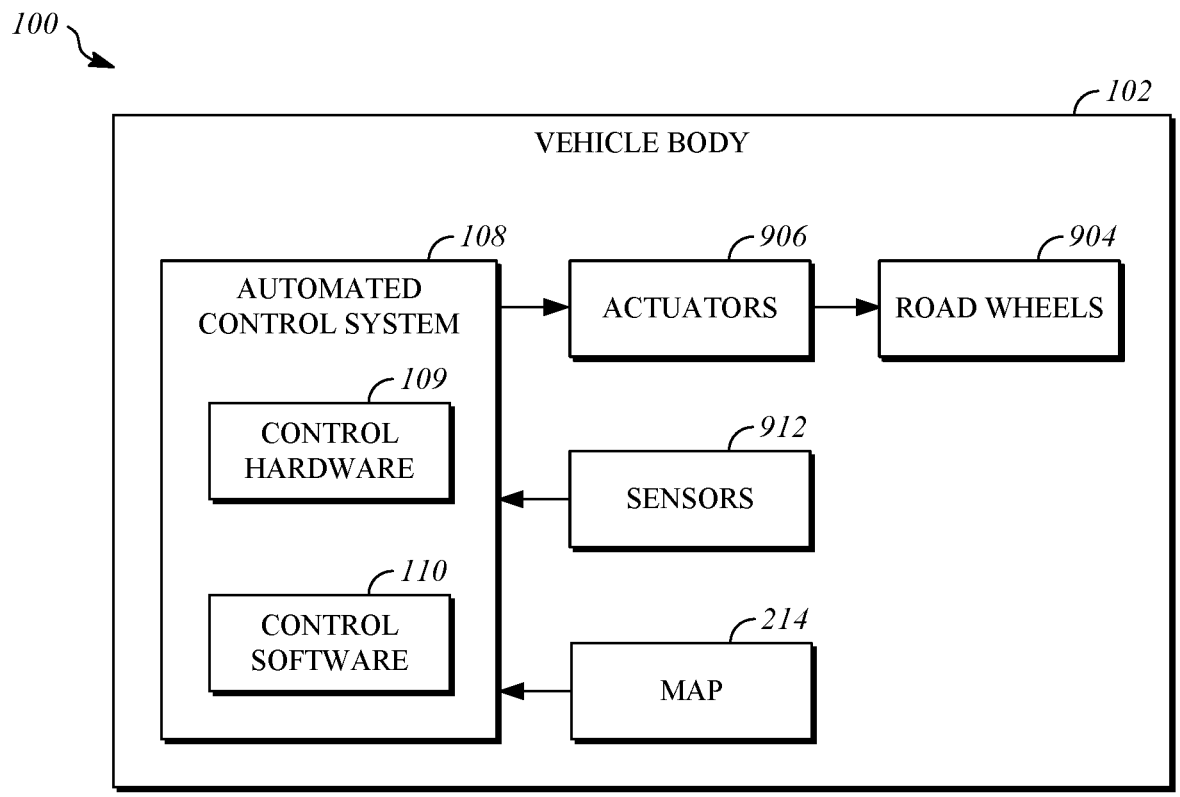
FIG. 9 is a block diagram that shows the vehicle.

FIG. 9 is a block diagram that shows the vehicle 100 and the vehicle body 102. The vehicle body 102 may include internal structural portions and external portions that are aesthetic and/or structural in nature. As examples, the vehicle body 102 may include one or more of a unibody, a frame, a subframe, a monocoque, and body panels.

The vehicle 100 can be a wheeled vehicle that includes wheels 904. As an example, the vehicle 100 can include four of the wheels 904, and other implementations are possible. The wheels 904 are the portion of the vehicle 100 that contacts the surface on which the vehicle 100 is travelling, and the characteristics of the wheels 904 are responsible, in part, for an amount of available friction. The wheels 904 may include tires, such as conventional pneumatic tires formed in part from synthetic rubber, or other friction-enhancing structures may be incorporated in the wheels 904.

The vehicle 100 includes actuators 906 that cause and control motion of the vehicle 100. Any type and combination of vehicle actuators may be utilized as the actuators 906, including actuators traditionally associated with road-going vehicles, off-road vehicles, aircraft, and watercraft.

The actuators 906 can include suspension actuators that are operable to control characteristics of the motion of the wheels 904 relative to the vehicle body 102, such as shocks, struts, springs, and sway bars. Active components and passive components can be used for the suspension actuators. The actuators 906 can include steering components that are operable to modify a steering angle of some or all of the wheels 904 relative to the vehicle body 102 in response to control signals, such as a conventional rack and pinion arrangement. The actuators 906 can include braking components that are operable to slow the speeds of the wheels 904, such as a conventional disk braking system. The actuators 906 can include propulsion components (i.e., a powertrain) that are operable to convert stored energy into driving force, and components that are operable to supply this force to some or all of the wheels 904 in order to propel the vehicle 100. Examples of propulsion components include an internal combustion engine that burns liquid fuel and an electric motor that utilizes electrical energy that is stored in batteries or is supplied by a generator.

The actuators 906 operate in response to control signals from an automated control system 108. The automated control system 108 is includes control software that makes decisions regarding operation of the vehicle 100 and using information that is received from sensors 912, a map 214, and optionally from other sources. The sensors 912 are part of the vehicle 100. The map 214 can be located in the vehicle 100 or can be accessed from an external source using, for example, a remote wireless data transfer system, such as a cellular modem. The decisions made by the automated control system 108 are used to generate control signals that are output by the automated control system 108 and transmitted to the actuators 906.

The automated control system 108 can implement motion planning functions that determine a trajectory for the vehicle 100, and actuator control functions that coordinate operation of the actuators 906 to attempt to follow the trajectory. The automated control system 108 includes control hardware 109 and control software 110 that implement the motion planning functions and the actuator control functions to cause autonomous operation of the vehicle 100. As an example, the vehicle 100 can operate autonomously in response to a command that specifies a destination. The command can be received from a human operator or from an external system. A motion plan and trajectory can be determined based on the destination, the information that is received from the sensors 912, and the information that is received from the map 214, including the attributes 241, the observables 242, the actions 243, and the rules 244. For example, the automated control system 108 can process the rules 244, evaluate states for the observables 242 as needed to evaluate the rules 244, and utilize the actions 243 as inputs by attempting to control the vehicle 100 in a manner that complies with the actions 243 to the extent that it is safe, reasonable, and prudent to do so.

As one example, the control hardware 109 can be implemented using a conventional computing device. As another example, the control hardware 109 can be implemented using specialized hardware such as an application-specific integrated circuit (ASIC) or a field-programmable gate array (FPGA). As another example, the control hardware 109 can be implemented using a combination of conventional computing devices and/or specialized hardware.

Figure 10:
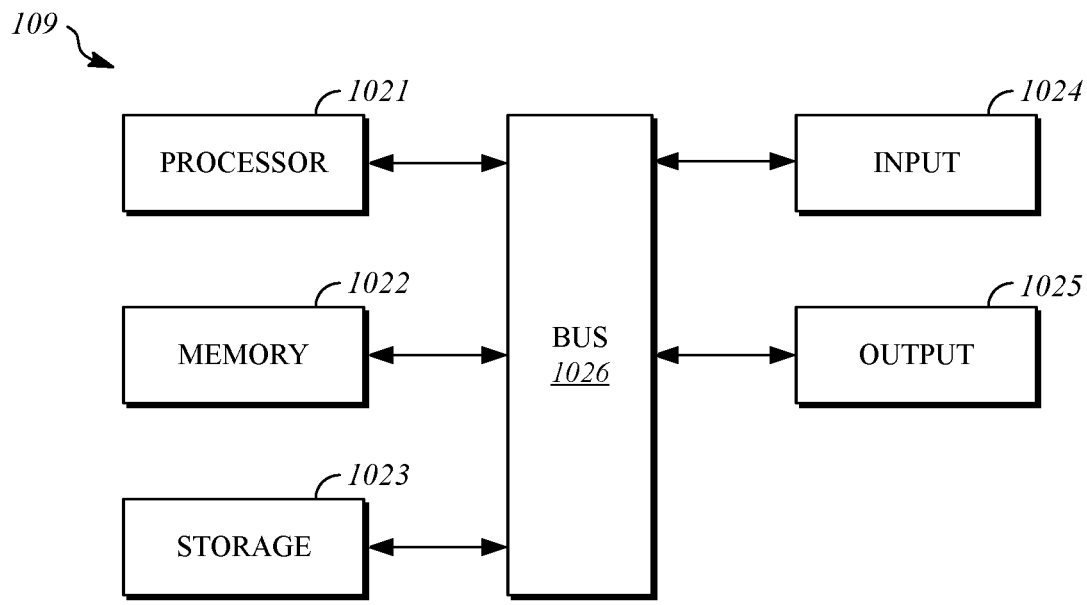
FIG. 10 is an illustration that shows an example of a configuration for control hardware of the automated control system.

FIG. 10 is an illustration that shows an example of a configuration for the control hardware 109. The control hardware 109 can include a processor 1021, a memory 1022, a storage device 1023, one or more input devices 1024, and one or more output devices 1025. The control hardware 109 can include a bus 1026 or a similar device to interconnect the components for communication. The processor 1021 is operable to execute computer program instructions and perform operations described by the computer program instructions. As an example, the processor 1021 can be a conventional device such as a central processing unit. The memory 1022 can be a volatile, high-speed, short-term information storage device such as a random-access memory module. The storage device 1023 can be a non-volatile information storage device such as a hard drive or a solid-state drive. The input devices 1024 can include any type of human-machine interface such as buttons, switches, a keyboard, a mouse, a touchscreen input device, a gestural input device, or an audio input device. The output devices 1025 can include any type of device operable to provide an indication to a user regarding an operating state, such as a display screen or an audio output.

With further reference to FIG. 9, the sensors 912 are in communication with the automated control system 108. The sensors 912 include numerous individual sensing components disposed at various locations around the vehicle 100. Some of the sensors 912 can be incorporated in the actuators 906.

The sensors 912 can include sensing components that are operable to perceive information regarding the environment around the vehicle 100 and output information regarding the environment around the vehicle 100, including objects and obstacles around the vehicle 100. As examples, the sensors 912 can include cameras, radar sensors, and LIDAR sensors. The sensors 912 can also include sensing components that are operable to perceive information regarding operating states and kinematic states of the vehicle 100, such as position sensors, orientation sensors (i.e., pitch, yaw, and roll), linear velocity sensors, angular velocity sensors, linear acceleration sensors, and angular acceleration (i.e. pitch rate change, yaw rate change, and roll rate change) sensors. The sensors 912 can also include sensing elements that receive information from external data sources, such as by receiving receiver for wireless beacon or presence signals broadcast by other vehicles, or by receiving messages from a centralized traffic coordination system. The sensors 912 can also including location sensing systems, such as a satellite-based positioning system (e.g., GPS).

What is claimed is:

1. A method, comprising:
   obtaining one or more rules that are encoded in a map as part of a segment of the map, wherein the one or more rules identify a dynamic object that is located at a geographic location that corresponds to the segment of the map, a first alternative action that may be taken based on evaluation of the dynamic object, and a second alternative action that may be taken based on evaluation of the dynamic object;
   determining a state of the dynamic object;
   evaluating the one or more rules using the state of the dynamic object to identify one of the first alternative action or the second alternative action as an action to be performed; and
   controlling a vehicle by an automated control system based on the action to be performed.

2. The method of claim 1, wherein the one or more rules include a conditional expression that is dependent upon the state of the dynamic object.

3. The method of claim 1, wherein the state of the dynamic object represents a dynamic property having at least a first possible value and a second possible value.

4. The method of claim 3, wherein the state of the dynamic object is a visible attribute of an element in an environment near the geographic location that corresponds to the segment of the map.

5. The method of claim 4, wherein the object is located using a sensor that is associated with the vehicle based on location information for the object that is included in the one or more rules as part of the identification of the dynamic object.

6. The method of claim 3, wherein the state of the dynamic object is obtained from a data source.

7. The method of claim 1, wherein the state of the dynamic object is determined by capturing an image using an image sensor, identifying an element in an environment around the vehicle that is associated with the state of the dynamic object in the image, and identifying the state of the dynamic object based on a visible attribute of the object.

8. The method of claim 7, wherein the visible attribute is a color.

9. The method of claim 1, wherein the one or more rules are obtained based on a position of the vehicle relative to the geographic location that corresponds to the segment of the map prior to entering the geographic location that corresponds to the segment of the map.

10. The method of claim 9, further comprising:
    in response to obtaining the one or more rules, identifying the state of the dynamic object as being required for evaluation of the one or more rules.

11. The method of claim 9, wherein the state of the dynamic object corresponds to an element in an environment that is located at the geographic location.

12. The method of claim 11, wherein the determination of the state of the dynamic object is performed based on a visual attribute of the object.

13. The method of claim 1, wherein evaluating the one or more rules using the state of the dynamic object includes comparing the state of the dynamic object to a state that is specified by the one or more rules.

14. The method of claim 1, wherein the one or more rules include evaluation of a Boolean expression having a true result that corresponds to identification of the first alternative action as the action to be performed and a false result that corresponds to identification of the second alternative action as the action to be performed.

15. A non-transitory computer-readable storage device including program instructions executable by one or more processors that, when executed, cause the one or more processors to perform operations, the operations comprising:
    obtaining one or more rules that are encoded in a map as part of a segment of the map, wherein the one or more rules identify a dynamic object that is located at a geographic location that corresponds to the segment of the map, a first alternative action that may be taken based on evaluation of the dynamic object, and a second alternative action that may be taken based on evaluation of the dynamic object;
    determining a state of the dynamic object;
    evaluating the one or more rules using the state of the dynamic object to identify one of the first alternative action or the second alternative action as an action to be performed; and
    controlling a vehicle by an automated control system based on the action to be performed.

16. The non-transitory computer-readable storage device of claim 15, wherein:
    the one or more rules include a conditional expression that is dependent upon the state of the dynamic object,
    the state of the dynamic object represents a dynamic property having at least a first possible value and a second possible value,
    the state of the dynamic object is determined by capturing an image using an image sensor, identifying an element in an environment around the vehicle that is associated with the state of the dynamic object in the image, and identifying the state of the dynamic object based on a visible attribute of the object, and
    the geographic location that corresponds to the segment of the map is different from a current geographic location of the vehicle and the one or more rules are obtained based on a position of the vehicle relative to the geographic location.

17. The non-transitory computer-readable storage device of claim 15, wherein evaluating the one or more rules using the state of the dynamic object includes comparing the state of the dynamic object to a state that is specified by the one or more rules.

18. The non-transitory computer-readable storage device of claim 15, wherein the one or more rules include evaluation of a Boolean expression having a true result that corresponds to identification of the first alternative action as the action to be performed and a false result that corresponds to identification of the second alternative action as the action to be performed.

19. A system, comprising:
a memory; and
a processor configured to execute instructions stored in the memory to:
obtain one or more rules that are encoded in a map as part of a segment of the map, wherein the one or more rules identify a dynamic object that is located at a geographic location that corresponds to the segment of the map, a first alternative action that may be taken based on evaluation of the dynamic object, and a second alternative action that may be taken based on evaluation of the dynamic object;
determine a state of the dynamic object;
evaluate the one or more rules using the state of the dynamic object to identify one of the first alternative action or the second alternative action as an action to be performed; and
control a vehicle by an automated control system based on the action to be performed.

20. The system of claim 19, wherein:
the one or more rules include a conditional expression that is dependent upon the state of the dynamic object, the state of the dynamic object represents a dynamic property having at least a first possible value and a second possible value,
the state of the dynamic object is determined by capturing an image using an image sensor, identifying an element in an environment around the vehicle that is associated with the state of the dynamic object in the image, and identifying the state of the dynamic object based on a visible attribute of the object, and
the one or more rules are obtained based on a position of the vehicle relative to the geographic location prior to entering the geographic location that corresponds to the segment of the map.

21. The system of claim 19, wherein the processor is further configured to evaluate the one or more rules using the state of the dynamic object by comparing the state of the dynamic object to a state that is specified by the one or more rules.

22. The system of claim 19, wherein the one or more rules include evaluation of a Boolean expression having a true result that corresponds to identification of the first alternative action as the action to be performed and a false result that corresponds to identification of the second alternative action as the action to be performed.

* * * * *